United States Patent
Guo et al.

(10) Patent No.: US 11,337,557 B2
(45) Date of Patent: May 24, 2022

(54) AIR CIRCULATION AND VENTILATION APPARATUS FOR FOOD PROCESSING MACHINE

(71) Applicant: GUANGDONG XINBAO ELECTRICAL APPLIANCES HOLDINGS CO., LTD., Foshan (CN)

(72) Inventors: Jiangang Guo, Foshan (CN); Qidong Mo, Foshan (CN)

(73) Assignee: GUANGDONG XINBAO ELECTRICAL APPLIANCES HOLDINGS CO., LTD., Foshan (CN)

( * ) Notice: Subject to any disclaimer, the term of this patent is extended or adjusted under 35 U.S.C. 154(b) by 645 days.

(21) Appl. No.: 16/068,739

(22) PCT Filed: Jun. 7, 2016

(86) PCT No.: PCT/CN2016/085121
§ 371 (c)(1),
(2) Date: Jul. 9, 2018

(87) PCT Pub. No.: WO2017/121068
PCT Pub. Date: Jul. 20, 2017

(65) Prior Publication Data
US 2019/0021551 A1 Jan. 24, 2019

(30) Foreign Application Priority Data

Jan. 15, 2016 (CN) .......................... 201610028690.0

(51) Int. Cl.
*A47J 43/07* (2006.01)
*A47J 43/046* (2006.01)
(Continued)

(52) U.S. Cl.
CPC .......... *A47J 43/0716* (2013.01); *A47J 43/046* (2013.01); *H02K 5/20* (2013.01); *H02K 9/06* (2013.01)

(58) Field of Classification Search
CPC ...... A47J 43/0716; A47J 43/046; H02K 9/06; H02K 5/20
See application file for complete search history.

(56) References Cited

U.S. PATENT DOCUMENTS

| 5,273,358 | A  | 12/1993 | Byrne et al. |
| 6,595,113 | B1 | 7/2003  | Chang        |

(Continued)

FOREIGN PATENT DOCUMENTS

| CN | 2715648 | 8/2005  |
| CN | 2740111 | 11/2005 |

(Continued)

OTHER PUBLICATIONS

International Search Report PCT/CN2016/085121 Completed Aug. 31, 2016; dated Sep. 12, 2016 5 pages.

(Continued)

*Primary Examiner* — Gary A Nash
(74) *Attorney, Agent, or Firm* — The Roy Gross Law Firm, LLC; Roy Gross

(57) ABSTRACT

An air circulation and ventilation apparatus for a food processing machine (70), and the air circulation and ventilation apparatus comprises: a motor (10) and a fan (30), in which the motor (10) is used for driving an agitating or pulverizing assembly and is arranged within a base of the machine, and a body (60) of the machine is disposed outside the base, and the gap between the body (60) and the outer side wall of the base forms an air inlet passage; the fan (30) is equipped with a driving motor and is arranged within the base, and under the effect of the fan (30), airflow enters the (Continued)

air inlet passage by means of an air inlet port (22) on the base and flows through the motor (10) within the base and is discharged from an outlet port (23) on the base. By independently and separately providing the motor (10) for driving the agitating or pulverizing assembly of the food processing machine (70) and the fan (30) for ventilation, the load on the motor (10) and the vibration of the food processing machine (70) maybe be reduced, while also reducing noise; the fan (30) drives the operation thereof, and can independently adjust the rotational speed thereof according to ventilation needs, thus preventing waste of resources; further, when an operation problem occurs with the motor (10), the motor (10) may be effectively cooled down, thus maintaining good heat-dissipation efficiency, thereby prolonging the service life of the food processing machine (70).

7 Claims, 3 Drawing Sheets

(51) Int. Cl.
    *H02K 5/20*        (2006.01)
    *H02K 9/06*        (2006.01)

(56) References Cited

U.S. PATENT DOCUMENTS

| | | | | |
|---|---|---|---|---|
| 2015/0290602 A1* | 10/2015 | Guo | ............ | A47J 43/0711 366/293 |
| 2019/0208961 A1* | 7/2019 | Arnett | ............ | H02K 5/24 |

FOREIGN PATENT DOCUMENTS

| | | |
|---|---|---|
| CN | 101172023 | 5/2008 |
| CN | 201617716 | 11/2010 |
| CN | 103648628 | 3/2014 |
| CN | 204541762 | 8/2015 |
| CN | 105411433 | 3/2016 |
| CN | 205379222 | 7/2016 |
| WO | 2009049355 | 4/2009 |

OTHER PUBLICATIONS

Written Opinion of the International Searching Authority PCT/CN2016/085121 dated Sep. 12, 2016 4 pages.

\* cited by examiner

AIR CIRCULATION AND VENTILATION APPARATUS FOR FOOD PROCESSING MACHINE

RELATED APPLICATIONS

This application is a National Phase of PCT Patent Application No. PCT/CN2016/085121 having International filing date of Jun. 7, 2016, which claims the benefit of priority of Chinese Patent No. 201610028690.0 filed on Jan. 15, 2016 entitled AIR CIRCULATION AND VENTILATION APPARATUS FOR FOOD PROCESSING MACHINE. The contents of the above applications are all incorporated by reference as if fully set forth herein in their entirety.

TECHNICAL FIELD

The present invention relates to a motor and its heat dissipation device of a household appliance, and specifically relates to an air circulation and ventilation apparatus for a food processing machine.

BACKGROUND ART

The food processing machine with agitating, pulverizing and other functions is popular with more and more people due to its simple and quick operation. However, with the improvement of people's quality of life, consumers have increasingly higher performance requirements for the operation reliability and noise and the like of such products.

An existing food processing machine usually uses a high-power or high-rotation-speed motor to improve the pulverizing effect on food. Accordingly, when the food processing machine works, its operating temperature relatively high, thereby affecting operating efficiency and reducing service life. Chinese patent application for invention CN 101172023B discloses an "Agitator for agitating food", in which a motor support 14 surrounds a motor 16 and further is provided with a fan 26. An agitator 10 and the fan 26 are both driven by the motor 16. After the fan 26 operates, the air around the motor 16 can be replaced with external cold air, so that the motor 16 keeps a normal operating temperature; however, the following problems still exist:

1. The load of the motor 16 is increased, and the operating efficiency is reduced;

2. Since the rotating speed of the motor 16 is relatively high, after the fan 26 is driven, the vibration frequency of the food processing machine is higher, and more noise is produced;

3. The fan 26 keeps the same rotating speed as that of the motor 16, and cannot independently adjust the rotating speed; the rotating speed of the fan 26 itself only needs to achieve a ventilation effect, an over-high rotating speed may cause the waste of resources; if the food in the agitator is hard, the agitator 10 will not be able to rotate, resulting in the motor not operating normally and the fan being unable to operate, and the food processing machine is easily damaged.

Hence, the existing food processing machine has the problems with relative large vibration and loud noise, as well as the fan being unable to adjust the rotating speed independently.

SUMMARY OF THE INVENTION

The technical problems to be solved by the present invention are that the existing food processing machine has the problems with relative large vibration and loud noise, as well as the fan being unable to adjust the rotating speed independently.

To solve the above-described technical problems, the technical solution applied in the present invention is to provide an air circulation and ventilation apparatus for a food processing machine, and the apparatus comprises:

A motor for driving an agitating or pulverizing assembly, which is arranged in a base of the machine, a body of the machine being arranged outside the base, and an air inlet passage being formed by a gap between the body and the outer side wall of the base;

A fan driven by its own motor, which is arranged in the base, and under the effect of the fan, air flow entering the air inlet passage from an air inlet port in the base, flowing through the motor in the base, and then being discharged through an air outlet port in the base.

In the present invention, the motor used for driving the agitating or pulverizing assembly of the food processing machine to operate and the fan used for exhausting air are independently arranged, which not only reduces the load of the motor, but also reduces the vibration of the food processing machine and noise at the same time; the fan drives itself to operate, and its rotating speed can be independently adjusted according to the ventilation needs, so that the rotating speed is maintained in a reasonable range for ensuring the ventilation effect, avoiding resource waste regardless of the influence of the operating state of the motor, and the fan can also effectively cool the motor temperature when a motor failure occurs, so as to keep better heat dissipation efficiency, thereby prolonging the service life of the food processing machine.

In the above-described air circulation and ventilation apparatus for the food processing machine, a motor cover with upper and lower openings is arranged in the middle of the base, and the motor is fixed in the motor cover through a motor support. According to the structural arrangement, the vibration of the base or body caused by the vibration of the motor can be reduced.

In the above-described air circulation and ventilation apparatus for the food processing machine, a convex strip is arranged on the motor support, a sliding groove is formed in the inner wall of the motor cover, and the motor support slides into the motor cover along the slide groove through the convex strip and is fixed. The structural arrangements of the motor support and the motor cover help rapid assembly and disassembly of the two.

In the above-described air circulation and ventilation apparatus for the food processing machine, the base is provided with a wind ring surrounding the periphery of the motor cover, the air outlet port is arranged on one side face of the wind ring, and the air inlet port is arranged on at least one of the remaining side faces of the wind ring. The air inlet port and the air outlet port are arranged on different side faces of the wind ring, thus such a structure design is simple and convenient, and does not occupy extra space.

In the above-described air circulation and ventilation apparatus for the food processing machine, a wind gathering cover is arranged below the motor, and an air outlet cover is fixedly arranged below the motor cover. The wind gathering cover is an annular groove with an upward opening, and the inner side face thereof becomes a taper with a gradually increasing inner diameter from top to bottom, and the fan is arranged between the wind gathering cover and the air outlet cover. The edge air flow in the motor cover can flow back upwards after being blocked by the wind gathering cover, so as to speed up the air flow in the motor cover, and the wind gathering cover can reasonably guide the direction of the air flow, so that the air flow enters the inlet of the fan to improve ventilation efficiency.

In the above-described air circulation and ventilation apparatus for the food processing machine, one side of the air outlet cover extends upwards to form an exhaust gate hole region, the fan is centrifugal, and the exhaust port of the fan and the air outlet port are both provided corresponding to the exhaust gate hole region. The exhaust gate hole region of the air outlet cover is provided corresponding to the exhaust port of the fan and the air outlet port of the base, thereby effectively reducing air flow noise.

In the above-described air circulation and ventilation apparatus for the food processing machine, both the air inlet port and the exhaust gate hole region are provided with densely arranged slotted holes. The structural arrangement of the slotted holes can ensure the air flow inlet and outlet to be uniform, reduce noise, and can also ensure the structural rigidity and stability of the base, and reduce vibration to a certain extent.

In the above-described air circulation and ventilation apparatus for the food processing machine, two sides of the motor are provided with elastic convex blocks and the corresponding positions of the motor cover are provided with convex block slides, a clamping block is arranged on the upper side of the motor support, and the clamping block is clamped and fixed on the end port of the convex block slide. The provision of elastic convex blocks can solve the vibration of the motor, reduce the influence on the motor support, and prevent the motor from moving in the motor support. The clamping and fixing mode of the clamping block and the convex block slide can ensure the assembly stability of the motor support and the motor cover.

In the above-described air circulation and ventilation apparatus for the food processing machine, the air outlet port is arranged at the bottom of the base, and the fan is in an axial flow type. The selection range of the fan type is increased and it is more applicable.

DETAILED DESCRIPTION

The present invention provides an air circulation and ventilation apparatus for a food processing machine, wherein the air circulation and ventilation apparatus can effectively reduce vibration and noise, and has a satisfactory heat dissipation function at the same time. The invention is further described in details below in combination with specific embodiments and the drawings of the description.

Figure 1:
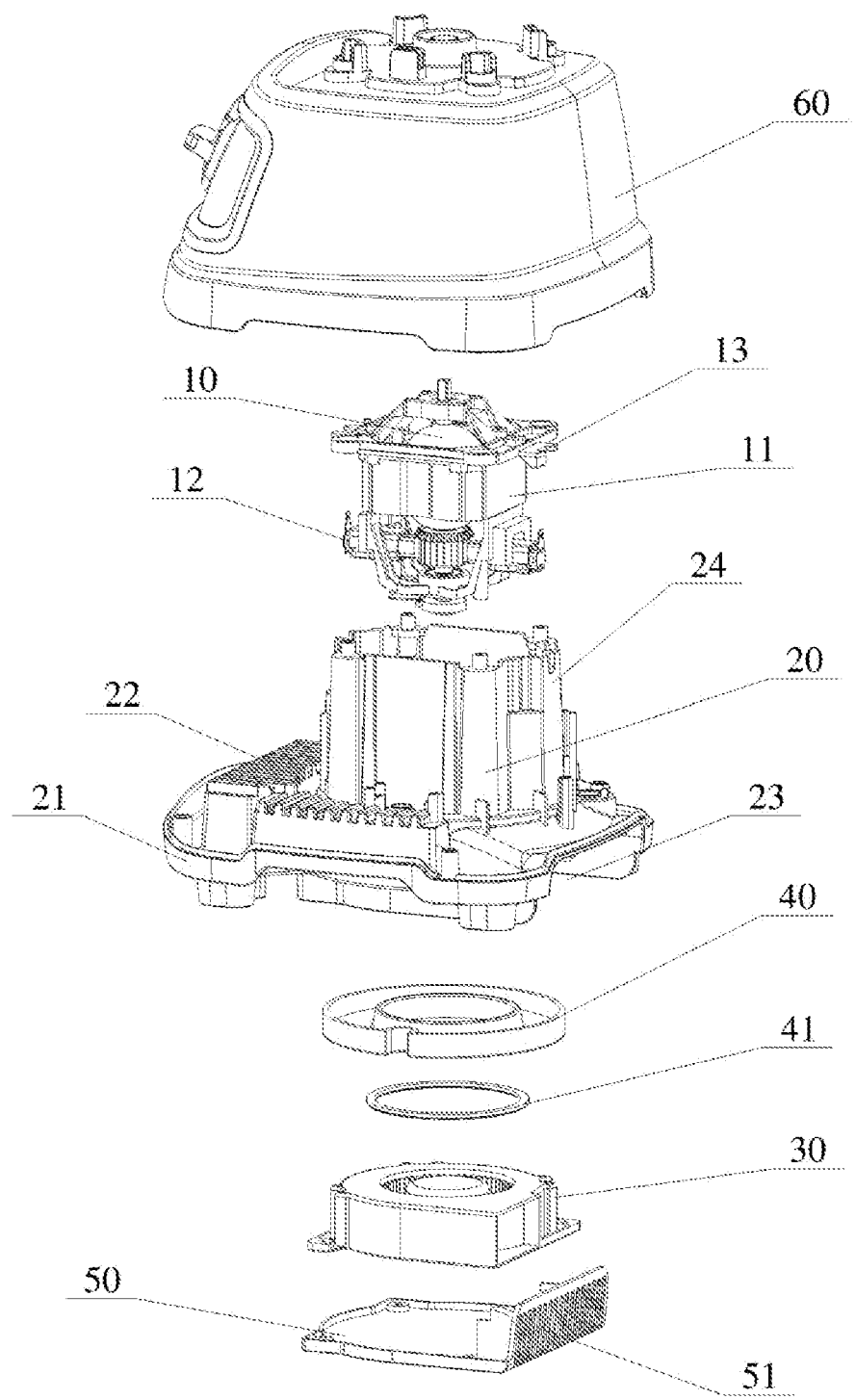
FIG. 1 is an exploded schematic view of the present invention.
Figure 2:
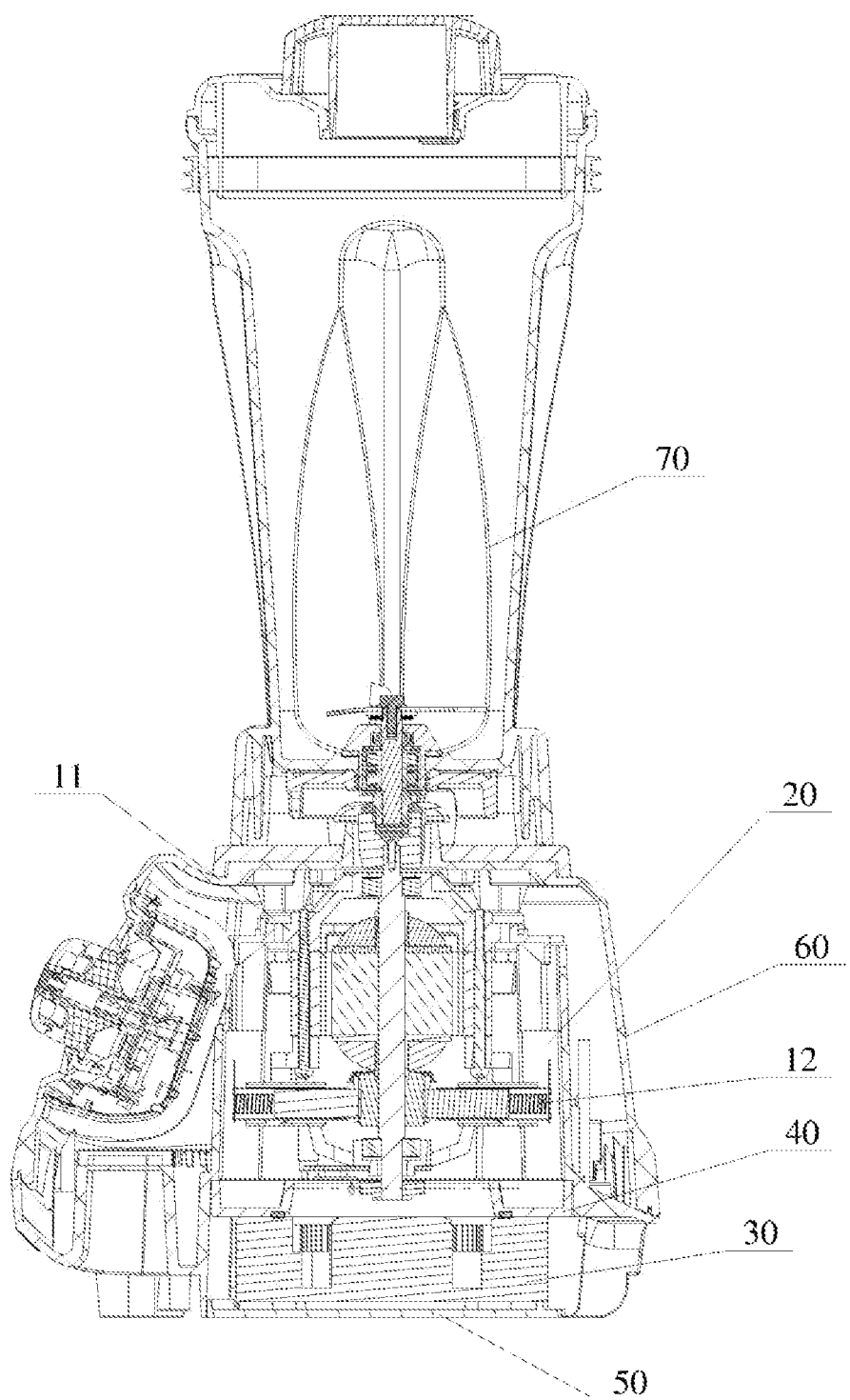
FIG. 2 is a sectional view of the present invention.
Figure 3:
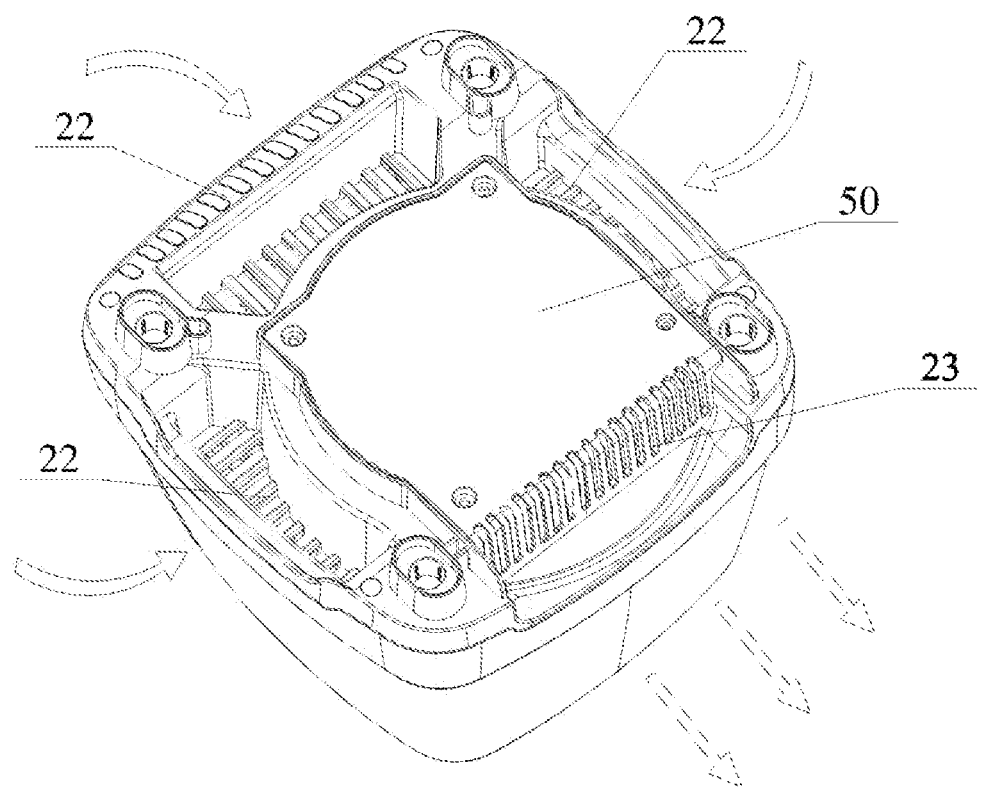
FIG. 3 is a bottom schematic view of the present invention.

As shown in FIG. 1 and FIG. 2, the present invention provides an air circulation and ventilation apparatus for a food processing machine that comprises a motor 10 and a fan 30. The motor 10 is used for driving an agitating or pulverizing assembly of a food processing machine 70 to operate and is arranged in a base of the machine. A body 60 of the machine is arranged outside the base, and an air inlet passage is formed by a gap between the body 60 and the outer side wall of the base. The fan 30 is driven by its own motor, and is arranged in the base. Under the effect of the fan 30, air flow enters the air inlet passage from an air inlet port 22 in the base, flows through the motor 10 in the base, and then is discharged through an air outlet port 23 in the base.

A motor cover 20 with upper and lower openings is arranged in the middle of the base, and the motor 10 is fixed in the motor cover 20 through the motor support 11. This structural arrangement can reduce the vibration of the base or body 60 caused by the vibration of the motor 10. A convex strip is arranged on the motor support 11, a sliding groove is formed in the inner wall of the motor cover 20, and the motor support 11 slides into the motor cover 20 along the sliding groove through the convex strip and is fixed. The structural arrangements of the motor support 11 and the motor cover 20 help rapid assembly and disassembly of the two.

A wind ring 21 is provided surrounding the periphery of the motor cover 20 on the base. The air outlet port 23 is arranged on one side face of the wind ring 21, and an air inlet port 22 is arranged on at least one of the remaining side faces of the wind ring 21. The air inlet port and the air outlet port are arranged on different side faces of the wind ring, and such a structure design is simple and convenient, and does not occupy extra space.

A wind gathering cover 40 is arranged below the motor 10, and an air outlet cover 50 is fixedly arranged below the motor cover 20. The wind gathering cover 40 is an annular groove with an upward opening, and the inner side face becomes a taper with a gradually increasing inner diameter from top to bottom. The fan 30 is arranged between the wind gathering cover 40 and the air outlet cover 50. The edge air flow in the motor cover 20 can flow back upwards after being blocked by the wind gathering cover 40, so as to speed up the air flow in the motor cover 20. The wind gathering cover 40 can reasonably guide the direction of the air flow, so that the air flow enters the inlet of the fan 30 to improve ventilation efficiency.

One side of the air outlet cover 50 extends upwards to form an exhaust gate hole region 51. The fan 30 is centrifugal, and the exhaust port of the fan 30 and the air outlet port 23 of the base are both provided corresponding to the exhaust gate hole region 51, thereby effectively reducing air flow noise. A sealing ring 41 is also arranged between the wind gathering cover 40 and the fan 30, so as to improve ventilation efficiency.

Both the air inlet port 22 and the exhaust gate hole region 51 are provided with densely arranged slotted holes. The structural arrangement of the slotted holes can ensure the air flow inlet and outlet to be uniform, reduce noise, and can also ensure the structural rigidity and stability of the base, and reduce vibration to a certain extent.

Two sides of the motor 10 are provided with elastic convex blocks 12 and the corresponding positions of the motor cover 20 are provided with convex block slides 24. A clamping block 13 is arranged on the upper side of the motor support 11, and the clamping block 13 is clamped and fixed on the end port of the convex block slide 24. The provision of elastic convex blocks 12 can solve the vibration of the motor 10, reduce the influence on the motor support 11, and prevent the motor from moving in the motor support 11. The clamping and fixing mode of the clamping block 13 and the convex block slide 24 can ensure the assembly stability of the motor support 11 and the motor cover 20.

The air outlet port 23 may also be arranged at the bottom of the base, wherein the fan 30 is in an axial flow type, thereby increasing the selection range of the fan type and being more applicable.

In the present invention, the motor used for driving the agitating or pulverizing assembly of the food processing machine to operate and the fan used for exhausting air are independently arranged, which not only reduces the load of the motor, but also reduces the vibration of the food processing machine and noise at the same time; the fan drives itself to operate, and its rotating speed can be independently adjusted according to the ventilation needs, so that the rotating speed is maintained in a reasonable range for ensuring the ventilation effect, avoiding resource waste regardless of the influence of the operating state of the motor. The fan can also effectively cools the motor temperature when a motor failure occurs, so as to keep better heat dissipation efficiency, thereby prolonging the service life of the food processing machine.

The present invention is not limited to the above-described preferred embodiments; any person should know that, any structural change made according to the teachings of the present invention, and any technical solutions same as or similar to those of the present invention all fall within the protection scope of the present invention.

The invention claimed is:

1. An air circulation and ventilation apparatus for a food processing machine, characterized by comprising:
    a motor for driving an agitating or pulverizing assembly, which is arranged in a base of the machine, a body of the machine being arranged outside the base, and an air inlet passage being formed by a gap between the body and the outer side wall of the base;
    a fan driven by its own motor, which is arranged in the base, and under the effect of the fan, air flow entering the air inlet passage from an air inlet port in the base, flowing through the motor in the base, and then being discharged through an air outlet port in the base, wherein
    the motor and the fan are independently arranged;
    the fan drives itself to operate, so as to adjust rotating speed independently according to the ventilation needs;
    a motor cover with upper and lower openings is arranged in the middle of the base, and the motor is fixed in the motor cover through a motor support; and
    a convex strip is arranged on the motor support, a sliding groove is formed in the inner wall of the motor cover, and the motor support slides into the motor cover along the sliding groove through the convex strip and is fixed; and the base is provided with a wind ring surrounding the periphery of the motor cover, the air outlet port is arranged on one side face of the wind ring, and the air inlet port is arranged on at least one of the remaining side faces of the wind ring.

2. The air circulation and ventilation apparatus for a food processing machine according to claim 1, characterized in that, a wind gathering cover is arranged below the motor, and the wind gathering cover is an annular groove with an upward opening, and the inner side face thereof becomes a taper with a gradually increasing inner diameter from top to bottom, an air outlet cover is fixedly arranged below the motor cover and the fan is arranged between the wind gathering cover and the air outlet cover.

3. The air circulation and ventilation apparatus for a food processing machine according to claim 2, characterized in that, one side of the air outlet cover extends upwards to form an exhaust gate hole region, the fan is centrifugal, and an exhaust port of the fan and the air outlet port are both provided corresponding to the exhaust gate hole region.

4. The air circulation and ventilation apparatus for a food processing machine according to claim 3, characterized in that, both the air inlet port and the exhaust gate hole region are provided with densely arranged slotted holes.

5. The air circulation and ventilation apparatus for a food processing machine according to claim 1, characterized in that, two sides of the motor are provided with elastic convex blocks and the corresponding positions of the motor cover are provided with convex block slides; a clamping block is arranged on the upper side of the motor support, and the clamping block is clamped and fixed on the end port of the convex block slide.

6. The air circulation and ventilation apparatus for a food processing machine according to claim 1, characterized in that, the air outlet port is arranged at the bottom of the base, and the fan is in an axial flow type.

7. The air circulation and ventilation apparatus for a food processing machine according to claim 1, characterized in that, the base is provided with a wind ring surrounding the periphery of the motor cover, the air outlet port is arranged on one side face of the wind ring, and the air inlet port is arranged on at least one of the remaining side faces of the wind ring.

* * * * *